United States Patent
Chanen et al.

(10) Patent No.: US 6,217,630 B1
(45) Date of Patent: Apr. 17, 2001

(54) CONDITIONED FERTILIZER PRODUCT, METHOD FOR CONDITIONING FERTILIZER, AND METHOD FOR USING CONDITIONED FERTILIZER PRODUCT

(75) Inventors: Michael J. Chanen, Balrico, FL (US); Bernhard George van Bommel, Ekeren (BE); Patrick R. Gruber, Blaine, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 09/303,703

(22) Filed: May 3, 1999

(51) Int. Cl.[7] ............................. C05C 9/00; C05G 5/00
(52) U.S. Cl. ............................................ 71/28; 71/64.12
(58) Field of Search ...................................... 71/28, 64.12

(56) References Cited

U.S. PATENT DOCUMENTS

| | | |
|---|---|---|
| 3,112,343 | 11/1963 | Allgeuer et al. . |
| 3,195,999 | * 7/1965 | Chance ............................. 71/64.12 |
| 4,033,938 | 7/1977 | Augurt et al. . |
| 4,160,782 | 7/1979 | Van Hijfte et al. . |
| 4,204,053 | 5/1980 | Elstrom et al. . |
| 4,214,888 | * 7/1980 | Young ................................... 71/28 |
| 4,309,206 | 1/1982 | Michaud et al. . |
| 4,526,938 | 7/1985 | Churchill et al. . |
| 4,587,358 | 5/1986 | Blouin . |
| 4,745,160 | 5/1988 | Churchill et al. . |
| 4,861,627 | 8/1989 | Mathiowitz et al. . |
| 5,032,164 | 7/1991 | Sanford et al. . |
| 5,142,023 | 8/1992 | Gruber et al. . |
| 5,176,734 | 1/1993 | Fujita et al. . |
| 5,248,700 | 9/1993 | Lance . |
| 5,338,822 | 8/1994 | Gruber et al. . |
| 5,360,892 | 11/1994 | Bonsignore et al. . |
| 5,510,526 | 4/1996 | Baniel et al. . |
| 5,563,238 | 10/1996 | Bonsignore et al. . |
| 5,645,624 | 7/1997 | Naka et al. . |
| 5,700,344 | 12/1997 | Edgington et al. . |
| 5,714,573 | 2/1998 | Randall et al. . |
| 5,798,435 | 8/1998 | Gruber et al. . |

FOREIGN PATENT DOCUMENTS

| | | |
|---|---|---|
| 2824112 A1 | 12/1979 | (DE) . |
| 19640269 A1 | 4/1998 | (DE) . |
| 0 094 513 A2 | 11/1983 | (EP) . |
| 7313 | * 3/1970 | (JP) . |
| 4-183782 | 6/1992 | (JP) . |
| 4-208217 | 7/1992 | (JP) . |
| 9-194280 | 7/1997 | (JP) . |
| 9-194281 | 7/1997 | (JP) . |
| WO 98/50611 | 11/1998 | (WO) . |
| WO 98/53141 | 11/1998 | (WO) . |

OTHER PUBLICATIONS

Allahiq, M. et al., "Formaldehyde And Derivative Products Their Application As Conditioning/Anticaking Agents For Urea Fertilizer", *Fertilizer Focus*, pp. 42–46 (Sep. 1996).

"Thyroid And Antithyroid Preparations To Vinyl Polymers", *Kirk–Othmer Encyclopedia Of Chemical Technology*, vol. 23, Third Edition, pp. 548–575 (Date Unknown).

Smith, M., "The Urea Granule—An "In Form" Choice", Presented at the Krupp Uhde Fertiliser Symposium 1998, 18 pages, (Jun. 1998).

* cited by examiner

*Primary Examiner*—Wayne Langel
(74) *Attorney, Agent, or Firm*—Merchant & Gould P.C.

(57) ABSTRACT

A conditioned fertilizer product is provided. The conditioned fertilizer product includes urea containing fertilizer and lactic acid derived conditioning agent. The conditioning agent is preferably included at a concentration of between about 0.1% by wt. and about 5% by wt. The conditioning agent is preferably lactic acid, lactide, and/or polylactide. A method for conditioning fertilizer is provided including a step of mixing urea containing fertilizer and conditioning agent at a temperature of between about 135° C. and about 145° C. A method for using conditioned fertilizer product is provided.

34 Claims, 1 Drawing Sheet

CONDITIONED FERTILIZER PRODUCT, METHOD FOR CONDITIONING FERTILIZER, AND METHOD FOR USING CONDITIONED FERTILIZER PRODUCT

FIELD OF THE INVENTION

The invention relates to a conditioned fertilizer product, to a method for conditioning fertilizer, and to a method for using conditioned fertilizer product. In particular, the invention relates to the use of a lactic acid derived conditioning agent for conditioning urea containing fertilizer.

BACKGROUND OF THE INVENTION

Granular urea is commonly used as a source of nitrogen in chemical fertilizer. Methods of manufacturing urea fertilizer as well as methods of processing fertilizer into particles via prill and/or granulation techniques are well known. In general, urea is produced commercially by the basic reaction of ammonia with carbon dioxide at elevated temperatures and pressures. Exemplary commercial applications are described in Kirk-Othmer, *Encyclopedia of Chemical Technology*, 3rd Ed., Vol. 23 (1983) pgs. 551–562. As described, the reaction products from such commercial processes are normally 70 to 80% aqueous urea solutions which can subsequently be processed to form solid urea particulates, such as granules. See Kirk-Othmer, *Encyclopedia of Chemical Technology*, 3rd Ed., Vol. 23 (1983) pgs. 562–572. The resulting urea particles/granules produced therefrom exhibit properties of caking and friability. The caking tendency causes the initially prepared, free-flowing product to change into a dense, solid, essentially singular mass in the storage pile. The friability property refers to the tendency of the urea granules to break easily into smaller particles. As a result, substantial amounts of dust can be generated as a result of handling, transporting, and applying the urea granules to the soil environment. Modern chemical fertilizer application equipment often includes rotating turbine fan type field distribution equipment which can result in breakage of the urea granules. As a result, the smaller particles fall in a shorter trajectory from the fertilizer distributor and form a more narrow and more concentrated swath on the soil surface than originally intended. In addition, the generated dust may cause health problems.

Numerous techniques have been developed for addressing the caking and friability properties of urea. One technique involves the addition of a small amount of formaldehyde as a conditioning agent. In general, formaldehyde is added in a concentration of between about 0.1% to 0.5% by weight and reacts with the urea to form urea-formaldehyde reaction products. While the addition of formaldehyde to urea modifies the caking and friability properties to desirable levels, formaldehyde has been designated as a toxic and/or carcinogenic material by the U.S. Environmental Protection Agency (EPA). This designation may lead to the restriction or total prohibition of the use of formaldehyde in agricultural products, including its use as a conditioning agent in the preparation of urea for fertilizer.

Urea-formaldehyde was developed as an alternative conditioning agent. The following patents discuss the reaction of formaldehyde with urea to form urea-formaldehyde products: U.S. Pat. No. 3,112,343 to Elstrom, et al.; U.S. Pat. No. 4,160,782 to Van Hiatte, et al.; and U.S. Pat. No. 4,204,053 to Allgeuer, et al. Health and safety considerations, however, have limited the use of formaldehyde in fertilizer products. A risk associated with the use urea-formaldehyde conditioning agent is related to storage and handling prior to blending with molten urea due to free formaldehyde in the conditioning agent.

Anti-caking properties have been imparted to fertilizer particles by utilizing clay, talc, and/or surfactants to coat the particles. Additionally, various oils are sprayed on the particles for controlling dust.

Another technique for modifying the caking and friability properties of urea is to treat the urea with lignosulfonates as described in U.S. Pat. No. 4,587,358 to Blouin, and by treating urea with modified lignosulfonate as described by U.S. Pat. No. 5,032,164 to Sanford et al.

Techniques have been developed for using polylactic acid polymers in controlled release applications including agricultural and waste management applications. See U.S. Pat. No. 5,563,238 to Bonsignore et al. and U.S. Pat. No. 5,360,892 to Bonsignore et al. Techniques have been developed for providing granular fertilizer with a decomposable coating. See U.S. Pat. No. 5,176,734 to Fujita et al. which describes using poly-3-hydroxy-3-alkylpropionic acid as a component of a decomposable coating for granular fertilizer.

SUMMARY OF THE INVENTION

A conditioned fertilizer product is provided by the present invention. The conditioned fertilizer product includes urea containing fertilizer and a conditioning amount of lactic acid derived conditioning agent. The lactic acid derived conditioning agent is provided in an amount which is sufficient to reduce the caking and friability properties of the urea containing fertilizer in the absence of the lactic acid derived conditioning agent. In general, the amount of lactic acid derived conditioning agent corresponds to between about 0.1% by wt. and about 5% by wt. The conditioning agent is preferably provided in an amount which is less than 2% by wt. The urea containing fertilizer generally contains at least about 50% by wt. urea. The lactic acid derived conditioning agent is preferably at least one of lactic acid, oligomers of lactic acid, polymers of lactic acid, lactide, oligomers of lactide, polymers of lactide, and mixtures thereof.

The conditioned fertilizer product can be prepared by mixing, at a temperature of between about 135° C. and about 145° C., urea containing fertilizer and between about 0.1% by wt. and about 5% by wt. lactic acid derived conditioning agent. The conditioning agent is preferably provided in a concentration of between about 0.2% by wt. and about 2% by wt., and, more preferably, between about 0.2% by wt. and about 0.4% by wt. The conditioned fertilizer product is preferably provided in the form of granules having an average size of between about 0.7 mm and about 5 mm.

A method for conditioning fertilizer is provided by the present invention. The method includes the steps of mixing urea containing fertilizer and conditioning agent at a temperature of between about 135° C. and about 145° C. to provide a molten mixture of urea containing fertilizer and conditioning agent, and cooling the mixture to provide granules. The conditioning agent is preferably a lactic acid derived conditioning agent. The step of mixing at a temperature of between about 135° C. and about 145° C. is preferably provided for between about 5 seconds and about 120 seconds. The step of cooling preferably includes granulating to provide granules having an average size of between about 0.7 mm and about 5 mm.

A method for using conditioned fertilizer product is provided by the invention. The method includes a step of applying fertilizer granules to soil using motor driven fertilizer spreading equipment. A preferred motor driven fertilizer spreading equipment is a rotating turbine fan field distribution equipment.

DETAILED DESCRIPTION OF THE INVENTION

Figure 1:
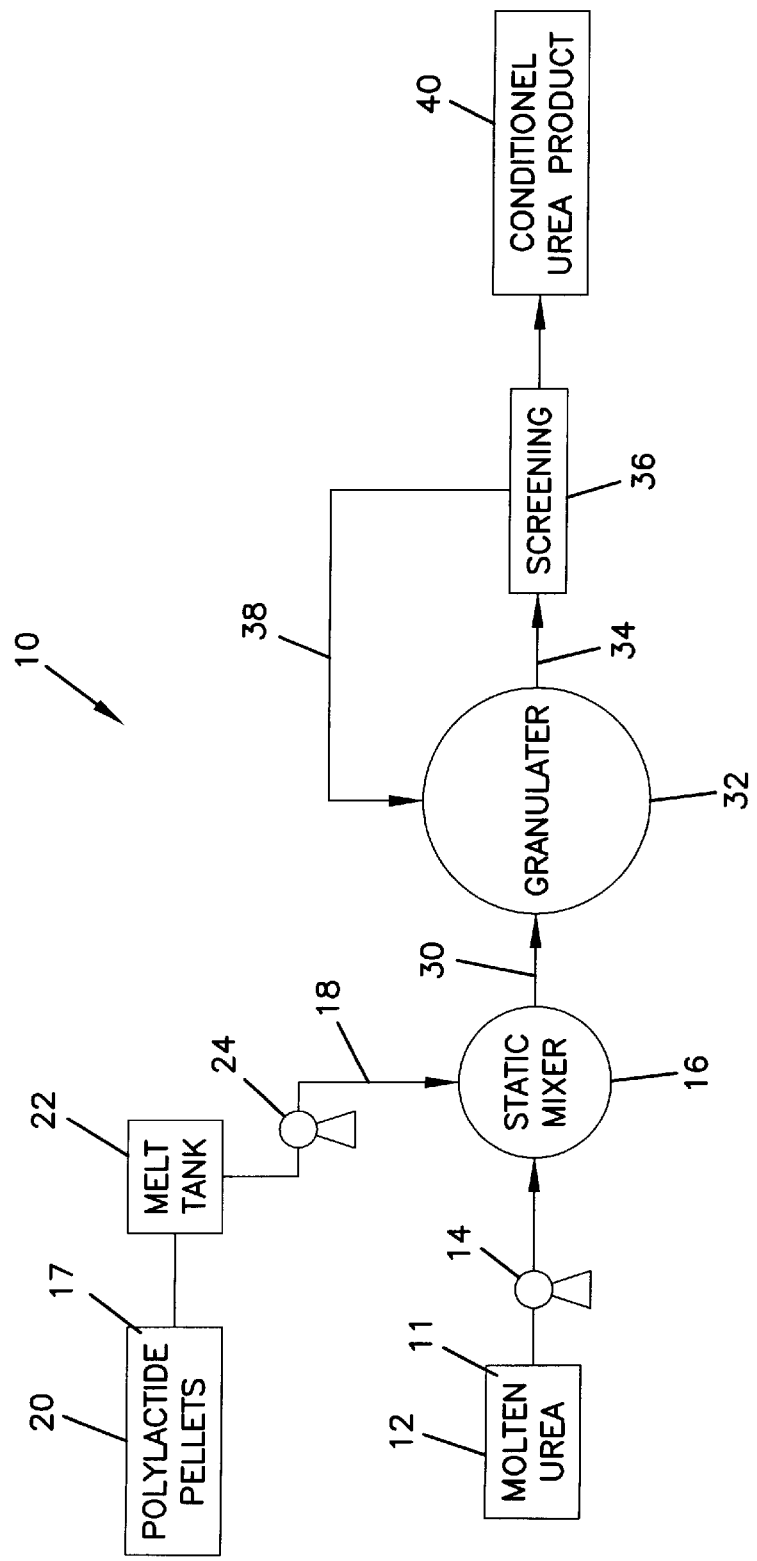
FIG. 1 is a diagrammatic view of a preferred method for preparing urea granules according to the present invention.

Fertilizers are often processed with a conditioning agent to control caking and friability properties. The term "conditioning" refers to the treatment of fertilizer with a conditioning agent to improve caking and friability properties compared with non-treated fertilizer. Caking refers to the tendency of fertilizers to absorb water and form a relatively dense, solid mass. In the case of granular fertilizer, the caking property cause bulk granular fertilizer to form a solid mass during storage and/or transport making it difficult to use the fertilizer in modern chemical fertilizer application equipment. The friability property refers to the tendency of the fertilizer to break into smaller particles resulting in a fairly uneven distribution of fertilizer. When granules break apart, it becomes difficult to evenly spread the urea on soil because commonly available fertilizer distribution machinery are designed for applying fertilizer having a relatively consistent granule size. Furthermore, the breaking of granules can cause dusting which can be a health problem.

Various types of fertilizers can be conditioned according to the invention. The preferred fertilizers which can be conditioned according to the invention include fertilizers containing a nitrogen source. A preferred fertilizer containing a nitrogen source includes urea containing fertilizer. It should be understood that "urea containing fertilizer" describes a fertilizer composition containing at least about 20% by weight urea, and more preferably at least about 50% by weight urea. A more preferred urea containing fertilizer contains at least about 90% by weight urea. Additional fertilizers which can be used according to the invention in place of or in addition to the urea containing fertilizer include ammonium sulfate (AS), ammonium nitrate (AN), triple super phosphate (TSP), diammonium phosphate (DAP), potassium chloride (KCL), and mixtures or blends of these fertilizers.

The conditioning agent which can be used according to the present invention is preferably a compostable or degradable conditioning agent. It is desirable for the conditioning agent to degrade or decompose into benign substances soon after the fertilizer is applied to soil. Preferred conditioning agents include lactic acid, lactide, and oligomers and polymers of lactic acid and/or lactide. These conditioning agents can generally be referred to as lactic acid derived conditioning agents.

Lactic acid derived conditioning agents are preferred conditioning agents according to the invention. Lactic acid derived conditioning agents include lactic acid and reaction products of lactic acid resulting in products containing lactic acid residues. In general, products or components containing lactic acid residues refer to oligomers and polymers which contain lactic acid residue. For example, lactide is a cyclic dimer of lactic acid and, therefore, contains the residue of two lactic acid molecules. Oligomers of lactic acid include lactide, including D-lactide, L-lactide, and meso-lactide. In addition, oligomers having lactic acid residues include DP-2, DP-3, etc. Oligomers and polymers containing lactic acid residue are often distinguished based upon molecular weight. For example, oligomers typically have a molecular weight of less than about 5,000, and normally less than about 2,000, and polymers typically have a molecular weight of greater than about 2,000 and, typically, greater than about 5,000. In the context of the present invention, oligomers and/or polymers containing lactic acid residue will be referred to as polylactide, polylactic acid, or PLA. Polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to homopolymers of polylactic acid or polylactide, as well as copolymers of lactic acid or lactide, wherein the resulting polymer comprises at least 50%, by weight, lactic acid residue repeating units or lactide residue repeating units. In this context, the term "lactic acid residue repeating unit" is meant to refer to the following unit:

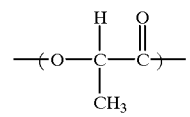

In view of the above definition, it should be clear that polylactide can be referred to both as a lactic acid residue containing polymer and as a lactide residue containing polymer. Herein the term "lactide residue repeating unit" is meant to refer to the following repeating unit:

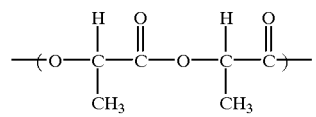

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

It should be understood that the phrases "PLA polymer" and "polylactide polymer" are not intended to limit the polymer to one containing only lactide residues and/or lactic acid residues, unless specifically identified as such. As used herein, the phrases "PLA polymer" and "polylactide polymer" cover polymers containing the above-described lactic acid residue repeating unit in an amount of at least 50%, by weight, based on the total repeating units in the polymer. Preferably, the polylactide polymer includes at least about 75%, by weight, and more preferably at least about 90%, by weight lactic acid residue repeating units. Furthermore, the phrases "PLA composition" and "polylactide composition" are not intended to limit the polymer composition to one containing only polylactide or polylactic acid as the polymer component, unless specifically identified as such. The composition can include other polymers or components blended in with the polymer containing at least 50%, by weight, polylactide, and more preferably at least about 75%, by weight, and even more preferably at least about 90%, by weight, polylactide.

PLA-based polymer compositions according to the present invention are generally prepared from polymerization of lactide or lactic acid. In some applications, the polymerization may be a copolymerization, with the lactide or lactic acid monomer copolymerized with another material. In some instances, the lactic acid or lactide may first be polymerized, with the resulting polymer mixture then being reacted, for example, copolymerized, with another material in order to provide for some desired modification, for example, relating to ductility, impact resistance, molecular weight and/or polydispersity.

U.S. Pat. No. 5,510,526 to Baniel et al. describe the recovery of lactic acid from a fermentation broth. The lactic acid, once recovered, can be processed according to U.S. Pat. No. 5,142,023 to Gruber et al. in order to provide polylactide polymer. Techniques relating to lactic acid recovery, polymerization of lactic acid, depolymerization and purification to provide lactide, and polymerization of lactide, are described in U.S. Pat. Nos. 5,510,526; 5,142,023; 5,338,822; 5,798,435; 5,714,573; and, U.S. patent application Ser. Nos. 08/862,612; 08/850,319; and 09/053,836. The disclosures of these patents and applications are incorporated herein by reference.

The polylactide polymer is particularly advantageous because it can be provided from renewable resources and can biodegrade relatively quickly so that its biomass can be reintroduced into the environment. Polylactide polymer can be considered, therefore, a relatively benign polymer in terms of overall impact on the environment.

Applicants have found that the acid concentration in a polylactide polymer composition generally influences the rate of hydrolysis. The impact of increased acid concentrations is believed to promote more rapid degradation by hydrolysis. Accordingly, it can be important to minimize the concentration of acid residuals (including acid and residual lactide concentrations) in order to resist hydrolysis thereby extending shelf life. Applicants believe that adding a certain type and amount of carboxylic acid to the polylactide composition allows one to provide a polylactide composition having lower levels of lactide compared with compositions not provided with the small amount of carboxylic acid. It is expected that this provides increased resistance to hydrolysis. Techniques for enhancing the stability of a polylactide composition are described in U.S. patent application Ser. No. 09/053,836, the entire disclosure of which is incorporated herein by reference. Conversely, increasing acid concentration is expected to increase the rate of hydrolysis thereby increasing the rate of degradation.

It should be understood that while additional components including copolymer units, blends of polymers, and additional units such as stabilizing agents and plasticizers, can be incorporated into the conditioning agent, it is desirable to limit the amount of these components in the conditioning agent because of expense. Furthermore, it is desirable to minimize the amount of conditioning agent used because it has the tendency of diluting the fertilizer. The fertilizer is applied to soil as a food source for plants. Adding components to the fertilizer increases the cost of the fertilizer and has a tendency of diluting the fertilizer. Accordingly, it is desirable to provide as little conditioning agent as possible to control the caking and friability properties of the fertilizer without greatly increasing the cost of the fertilizer.

Urea can be prepared by reacting ammonia and carbon dioxide at elevated temperatures and pressures. Exemplary commercial applications are described in Kirk-Othmer, *Encyclopedia of Chemical Technology*, 3rd Ed., Vol. 23 (1983) pgs. 551–562. The melted urea will generally have a water concentration of between about 3.5% by wt. and about 4% by wt. The water is preferably removed to provide a concentrated urea product having less than about 0.25% by wt. water. Preferably, the amount of water is between about 0.2% by wt. and about 0.25% by wt. In general, the amount of water should be sufficiently reduced to avoid caking.

Techniques for processing molten urea into prills or granules can be referred to as finishing processes. Several finishing techniques which can be used according to the invention are commonly known and are described in Kirk-Othmer, *Encyclopedia of Chemical Technology*, 3rd Ed., Vol. 23 (1983) pgs. 562–572, and Smith, "The Urea Granule—An 'In Form' Choice," presented at the Krupp Uhde Fertilizer Symposium, Dortmund, June 1998. The techniques for preparing prills and granules according to the invention can be referred to as: the prilling bucket process; the static head prilling process; the ultrasonic and resonation head prilling process; the pan granulation process; the drum granulation process; the falling curtain drum granulation process; the fluid bed granulation process; and the spouted (fluid) bed process.

According to the present invention, the conditioning agent is added to molten fertilizer. In the case of urea containing fertilizer, the temperature should be above the melting temperature of urea. In general, this corresponds to a temperature of greater than about 135° C. Because urea is temperature sensitive, it is desirable not to overheat the urea and not to provide it at elevated temperatures for too long. Urea tends to self-polymerize at elevated temperatures, thereby forming biuret. Biuret is a dimer of urea and is considered toxic to certain plants. To avoid the formation of biuret when preparing a fertilizer, it is desirable to provide the molten urea at a temperature below about 145° C. for a period of time of less than about 5 minutes. Molten urea is preferably provided at a temperature between about 135° C. and about 145° C. for a time period of less than about 3 minutes. Molten urea is preferably provided in a molten state for less than 50 seconds, and more preferably less than 40 seconds in order to avoid biuret formation. In a preferred embodiment, the granules are formed within about 30 seconds of melting the urea.

The polylactide is preferably provided so that it melts at a temperature below the highest temperature to which the urea is heated. That is, it is desirable for the polylactide to melt and disperse in the molten urea. This generally corresponds to a polylactide melting temperature of less than about 135° C. and preferably below about 130° C. The polylactide preferably has a melt flow index of greater than about 500 grams according to ASTM D-1238 at 135° C. It is generally desirable for the polylactide to be relatively amorphous. Amorphous polylactide generally has a lower melting temperature compared with semi-crystalline polylactide. Amorphous polylactide generally corresponds to polylactide having D-lactide residues in a concentration of between about 15% by wt. and about 85% by wt, and, more preferably, between about 25% by wt. and about 75% by wt.

It is generally desirable to keep the amount of conditioning agent in the molten urea as low as possible and achieve the desired levels of caking and friability reduction. Accordingly, the amount of conditioning agent incorporated into the molten urea should be less than about 5% by weight. Preferably, the amount of conditioning incorporated into the molten urea is less than about 2% by weight. In order to provide the desired level of caking and friability reduction, the conditioning agent should be incorporated in an amount greater than about 0.1% by weight. Preferably, the amount of conditioning agent is between about 0.2% by weight and 1.0% by weight and more preferably between about 0.25% by weight and 0.5% by weight.

Several grades of product can be provided by the present invention. In general, feed grade product can be provided wherein the particles have an average size of between about 0.7 mm and about 1.2 mm. The particles are generally prilled and have a low biuret content. Prill grade refers to particles having a size of between about 0.9 mm and about 2.2 mm. Single fertilizer grade generally has an average particle size of between about 1.0 mm and about 3.0 mm. This grade can be prilled and/or granulated. Bulk blending grade generally has an average size of between about 2.0 mm and about 5.0 mm. This grade is mostly granules blended of nitrogen, potassium and phosphorous, and includes an average size of between about 3.0 mm and about 4.0 mm and are generally provided for arial spreading. Deep dressing grade generally has a size of between about 6.0 mm and about 12.0 mm and can be referred to as super granule urea and is generally used for high nitrogen efficiency injection. It should be understood that all of these sizes can be characterized as granules.

The conditioned fertilizer should provide the desired level of low caking and friability properties. These properties can be reflected in moisture absorption and crush strength. In the case of urea conditioned fertilizer having dimensions of 8 mm thick and 20 mm wide, the crush strength should be greater than about 15 kg. and the moisture absorption should be less than about 121% under conditions described in Example 1. Applicants have found that it is even more desirable to provide a crush strength of greater than about 19 kg and a moisture absorption of less than about 116%.

Now referring to FIG. 1, a method for preparing fertilizer granules according to the present invention is described at reference numeral 10. The method for preparing fertilizer granules 10 includes the processing of molten fertilizer 11 and conditioning agent 17. In a preferred embodiment, the molten fertilizer 11 is a molten urea solution 12, and the conditioning agent 17 is a polylactide containing conditioning agent 20. Molten urea solution 12 is provided and fed via pump 14 into the static mixer 16. The molten urea solution 12 is preferably provided at a temperature of between about 135° C. and about 145° C. Molten polylactide 18 is preferably provided to the static mixer 16 at a temperature between about 135° C. and 145° C. The molten polylactide 18 is preferably added to molten urea 12 at a concentration of about 0.1% by weight and about 5% by weight.

The molten polylactide 18 can be provided from polylactide pellets which are melted in a tank or extruder 22. The molecular weight of the polylactide is preferably low enough so that, when melted, it can be processed through a metering pump 24 to provide a consistent metered about of molten polylactide 18 into the static mixer 16. While the invention is preferably practiced by melting the polylactide prior to introduction into the static mixer, it should be appreciated that the polylactide can be fed as a solid into the static mixer. That is, the polylactide can be melted upon contact with the molten urea. It is advantageous to melt the polylactide because of its tendency to stick when provided in solid form. Furthermore, it is expected that adding solid polylactide to the static mixer will increase the length of time the molten urea will be provided at an elevated temperature.

The molten polylactide 18 and the molten urea 12 are fed to the static mixer 16 to provide a sufficiently mixed urea and polylactide composition 30. The urea and polylactide composition 30 is fed to the granulator 32 to rapidly reduce the temperature of the urea and polylactide composition 30 and to provide granules 34. It is expected that excess moisture will be vented during the granulation step. The resulting granules 34 are then sent to a screen 36 for the removal of oversized and undersized granules 38 which can then be ground up and used as seed material in the granulator 32. The resulting granules can be referred to as the conditioned urea product 40.

The following examples are provided to illustrate the invention. They are not intended to limit the scope of the invention.

EXAMPLE 1

Urea-formaldehyde was obtained under the name UF-80 from Borden Chemicals, Canada and can be characterized as containing 20% water, 57% formaldehyde and 23% urea. Low biuret containing urea was obtained from Sigma Chemical. Polylactide polymer, lactide and lactic acid were obtained from Cargill Dow Polymers. Prior to use, the urea, polylactide and lactide were stored in sealed polyethyene bags, then placed in sealed plastic jugs with desiccant pouches. All materials were stored at about 25° C.

The use of polylactide, lactide, and lactic acid as urea conditioning agents was compared to untreated urea at 0.25, 0.5, and 1%, urea basis. Additionally compared was urea-formaldehyde as a conditioning agent at 0.88% which is a typical dose for commercial processes. Properties of the various tested conditioning agents are provided in Table 1.

TABLE 1

Weight Average Molecular Weight and Melt Flow Index of Various Conditioning Agents

| Material | Polymer Molecular Weight (wt. ave.) | % R-lactic acid | Melt Flow Index at 135° C. (grams) |
|---|---|---|---|
| Urea-formaldehyde-80 | — | n/a | >500 |
| Untreated Urea | — | n/a | >500 |
| PLA | 20,000 | 24 | >500 |
| PLA | 57,000 | 24 | 188 |
| PLA | 52,000 | 5 | 0.3 |
| PLA | 103,000 | 21 | 2 |
| PLA | 139,000 | 11.5 | 49.8 |
| Meso Lactide | 144 | 50 | >500 |
| L-Lactide | 144 | 0 | >500 |
| D, L-Lactide | 144 | 50 | >500 |
| Lactic Acid | 90 | monomer | >500 |

Crush strength was evaluated according to the method described in U.S. Pat. No. 4,587,358 to Blouin and U.S. Pat. No. 5,032,164 to Sanford et al. Fourty gram batches of urea were heated with a rheostat-controlled heating mantle, with constant, manual agitation to a temperature of 135° C. The urea was immediately transferred to a pre-heated magnetic stir plate to maintain urea temperature between 135–137° C. Conditioning agents were added to the molten urea and the mixture was held under constant agitation for a total of 2 minutes. The mixture was then poured into porcelain color plates where it quickly solidified into hemisphere-like segments about 8 mm thick and 20 mm wide. After cooling and aging 4 hours, the hemisphere-like segment pellets were tested for hardness by compressing them in a Ametek compression tester to the breaking point. The hardness was based on an average of nine replicates. Untreated urea was heated, mixed and formed into pellets in the same manner.

Urea hemispheres were tested for moisture absorption by storing triplicate, two gram hemisphere samples for 48 hours at 22° C. and 95% relative humidity. Moisture absorption was determined by reweighing and calculating the percent weight gain.

Weight average molecular weight values for polylactide materials were determined by gel permeation chromatography. Melt flow index values were included because they are believed to be an effective indicator of acceptable material. Melt flow index values were determined according to ASTM D-1238. In particular, melt flow index values were determined at 135° C., 6 minute preheat time prior to measurement, 2160 g plunger weight and 0.082 inch orifice. Melt flow index is based on the time required for a standard volume of material to be displaced. Melt flow index time results are then converted to grams of material displaced. Higher calculated weight values represent relatively lower material viscosity at 135° C.

Urea-formaldehyde significantly improved urea crush strength and reduced moisture absorption in high humidity. Polylactide at 20,000 weight average molecular weight and containing 24% R-lactic acid residues were evaluated as conditioning agents at concentrations of 1%, 0.5%, and 0.25%. The 20,000 Mw/24% R-lactic acid polylactide provided similar performance compared with urea-formaldehyde at 1% and 0.5%, but was slightly less effective than urea-formaldehyde at 0.25%. The 20,000 Mw/24% R-lactic acid polylactide gave similar performance to urea-formaldehyde at 1% and 0.5% levels. At 0.25% level, 20,000 Mw polylactide was slightly less effective than urea-formaldehyde. Some degradation of the polymer could have occurred since the original studies, leading to slightly poorer performance.

TABLE 2

Crush Strength and Moisture Absorption for Conditioned Urea

| Conditioning Agent (molecular weight/R-lactic acid %) Concentration | Crush Strength, kg, (std. Error) | Moisture absorp., %, (std. error) | Comments |
| --- | --- | --- | --- |
| Untreated control | 11.8(1.3) | 121.5(.5) | urea expanded during resolidification |
| Urea-formaldehyde-80, 0.88% dose | 19.5(1.2) | 115.6(.5) | conditioning agent(liquid) dispersed into molten urea, urea didn't expand |
| Polylactic acid (20,000/24%), 1% | 19.6(1.0) | 115.1(0.4) | conditioning agent softened, dispersed into molten urea, urea didn't expand |
| Polylactic acid (20,000/24%), 0.5% | 18.9(1.0) | 115.0(0.5) | conditioning agent softened, dispersed into molten urea, urea didn't expand |
| Polylactic acid (20,000/24%), 0.25% | 16.9(0.9) | 116.0(0.6) | conditioning agent softened, dispersed into molten urea, urea expanded |
| Polylactic acid (103,000/21%), 1% | 14.5(1.2) | 120.9(0.5) | conditioning agent softened, didn't disperse, urea expanded |
| Polylactic acid (103,000/21%), 0.5% | 12.1(1.2) | 121.2(0.7) | conditioning agent softened, didn't disperse, urea expanded |
| Polylactic acid (103,000/21%), 0.25% | 11.5(0.8) | 121.3(0.5) | conditioning agent softened, didn't disperse, urea expanded |
| Polylactic acid (139,000/11.5%), 1% | 11.1(0.8) | 121.5(0.4) | conditioning agent softened, didn't disperse, urea expanded |
| Polylactic acid (139,000/11.5%), 0.5% | 11.0(0.8) | 121.0(0.6) | conditioning agent softened, didn't disperse, urea expanded |
| Polylactic acid (139,000/11.5%), 0.25% | 11.0(1.2) | 121.2(0.6) | conditioning agent softened, didn't disperse, urea expanded |
| Polylactic acid (57,000/24%), 1% | 16.4(1.1) | 119.4(0.3) | conditioning agent softened, 1/2 dispersed, urea expanded |
| Polylactic acid (57,000/24%), 0.5% | 12.5(0.8) | 120.0(0.3) | conditioning agent softened, 1/2 dispersed, urea expanded |
| Polylactic acid (57,000/24%), 0.25% | 12.0(0.9) | 121.1(0.5) | conditioning agent softened, 1/2 dispersed, urea expanded |
| Polylactic acid (57,000/5%), 1% | 11.7(1.2) | 120.9(0.5) | conditioning agent softened, didn't disperse, urea expanded |
| Polylactic acid (57,000/5%), 0.5% | 11.1(1.2) | 121.5(0.5) | conditioning agent softened, didn't disperse, urea expanded |
| Polylactic acid (57,000/5%), 0.25% | 11.5(1.1) | 121.6(0.4) | conditioning agent softened, didn't disperse, urea expanded |
| L-lactide(144), 1% | 18.7(1.2) | 116.5(0.4) | conditioning agent softened, dispersed into molten urea, urea didn't expand |
| L-lactide(144), 0.5% | 15.2(0.8) | 120.9(0.4) | conditioning agent softened, dispersed into molten urea, urea expanded |
| L-lactide(144), 0.25% | 14.1(1.0) | 121.6(0.5) | conditioning agent softened, dispersed into molten urea, urea expanded |
| D, L-lactide(144), 1% | 18.7(1.2) | 116.9(0.6) | conditioning agent softened, dispersed into molten urea, urea didn't expand |
| D, L-lactide(144), 0.5% | 15.0(1.4) | 120.8(0.4) | conditioning agent softened, dispersed into molten urea, urea expanded |
| D, L-lactide(144), 0.25% | 14.3(1.0) | 121.8(0.5) | conditioning agent softened, dispersed into molten urea, urea expanded |
| Meso-lactide(144), 1% | 20.9(1.2) | 117.0(0.5) | conditioning agent softened, dispersed into molten urea, urea didn't expand |
| Meso-lactide(144), 0.5% | 16.2(1.1) | 120.7(0.3) | conditioning agent softened, dispersed into molten urea, urea expanded |
| Meso-lactide(144), 0.25% | 14.8(0.9) | 121.8(0.5) | conditioning agent softened, dispersed into molten urea, urea expanded |

TABLE 2-continued

Crush Strength and Moisture Absorption for Conditioned Urea

| Conditioning Agent (molecular weight/R-lactic acid %) Concentration | Crush Strength, kg, (std. Error) | Moisture absorp., %, (std. error) | Comments |
|---|---|---|---|
| Lactic acid(90), 1% | 21.6(1.5) | 119.5(0.2) | conditioning agent(liquid) Dispersed into molten urea, urea didn't expand |
| Lactic acid(90), 0.5% | 13.9(1.6) | 120.8(0.4) | conditioning agent(liquid) Dispersed into molten urea, urea expanded |
| Lactic acid(90), 0.25% | 12.5(1.1) | 121.7(0.4) | conditioning agent(liquid) Dispersed into molten urea, urea expanded |

Polylactide 57,000 Mw/24% R-lactic acid and 103,000 Mw/21% R-lactic acid were less effective than urea-formaldehyde. Polylactide 52,000 Mw/5% R-lactic acid and 139,000 Mw/11.5% R-lactic acid were much less effective than urea-formaldehyde. Lactides gave similar improvement in crush strength relative to urea-formaldehyde at 1% level, but were much less effective at lower levels. All lactides were less effective in reducing urea moisture absorption relative to urea-formaldehyde and 20,000 Mw polylactide. Lactic acid, at 1%, gave similar improvement in crush strength compared to urea-formaldehyde, but provided minimal reduction in moisture uptake. Lactic acid at lower levels was much less effective than urea-formaldehyde.

It is believed that the most effective conditioning agents are those which melt and disperse into molten urea. These include urea-formaldehyde, lower Mw PLA/high R-lactic acid (20,000/24%), lactides and lactic acid dispersed into 135° C. urea. The 57,000/24% R-lactic acid partially dispersed and was more effective than higher Mw/lower R-lactic acid polylactide. High Mw polylactide is typically heated to 160–190° C. to process the polymer for various applications. Low Mw/high R-lactic acid gives an amorphous polymer that melts at a relatively low temperature. Based on melt flow tests, a melt flow index (MFI) of at least 188 grams at 135° C. (57,000 Mw/24% R-lactic acid) gives a partially effective material. A MFI greater than 500 g indicated the material will be effective at the 1% dose.

When molten, untreated urea cools in porcelain plates, it expands. Treatments that provided the best crush strength reduced urea expansion. Treatments that did not melt and disperse into molten urea, did not inhibit urea expansion. Inhibition of urea expansion did not require polymerized lactic acid. Lactide and lactic acid gave similar crush strength relative to urea-formaldehyde at 1% dose. Assuming lactide ring opens after addition to urea, expansion of urea could be related to addition of acid. Inhibition could be due to binding of free ammonia, formation of urea-lactic/lactate complex or hydrogen-bonding. U.S. Pat. No. 5,032,164 to Sanford, et al. indicates oxidation of lignosulfonate sugars to carboxylic acid sugars results in a more effective binder for urea granulation. U.S. Pat. No. 4,587,358 to Blouin describes the use of lignosulfonates as binders without chemical modification. Since lactic acid and lactide performance drops off at doses below 1%, adhesion of urea particles by polymeric lactic acid may be involved. The pH of 3% solutions of UF 80, lactic acid and 20,000 Mw PLA were 4.60, 3.73 and 5.60, respectively. In addition, lignosulfonate liquor exhibits a pH of about 5.50.

Since lactic acid and lactide gave minimal reduction in urea moisture absorption, it appears polymeric lactic acid provides a hydrophobic coating around urea particles.

EXAMPLE 2

Polylactide was obtained from Cargill Dow Polymers LLC of Minnetonka, Minn. The weight average molecular weight of the polylactide was 19,500 and it was ground to minus U.S. Sieve #100 prior to use. The use of polylactide as a conditioning agent was compared to the use of urea-formaldehyde as a conditioning agent, and untreated urea. The urea-formaldehyde conditioning agent was obtained under the name UF-80 from Borden Chemicals, Canada. The urea-formaldehyde conditioning agent includes 20% water, and residues of 57% formaldehyde and 23% urea.

Crush strength was evaluated according to the method described in U.S. Pat. No. 4,587,358 to Blouin and U.S. Pat. No. 5,032,164 to Sanford, et al. Low biuret urea was obtained from Sigma Chemicals. Twenty-gram batches of molten urea at 140° C. were treated by adding small amounts of polylactic acid or UF 80 with thorough mixing for 2 minutes. The polylactic acid melted immediately when added to the molten urea. The mixture was then poured into porcelain color plates where it quickly solidified into hemisphere-like segments about 8 mm thick and 20 mm wide. After cooling and aging 24 hours, the hemisphere-like segment pellets were tested for hardness by compressing them in a compression tester to the breaking point. The hardness was based on an average of 6 replicates. Untreated urea was heated, mixed and formed into pellets in a similar manner. Polylactic acid and UF 80 were added to the molten urea at a rate of 1%, weight basis. Results are presented in Table 3.

TABLE 3

| Additive | Average Crush Strength, Kg | Standard Error |
|---|---|---|
| Untreated | 14.3 | 1.1 |
| 1% UF-80 | 21.5 | 0.9 |
| 1% polylactic acid | 22.4 | 1.4 |

From the above data it is apparent that the polylactic acid yielded a crushing strength (hardness) that was much greater than untreated urea and within the standard deviation for urea conditioned with UF-80.

EXAMPLE 3

Materials and methods were identical to Example 2. Results are presented in Table 4.

TABLE 4

| Additive | Dose, % | Average Crush Strength, Kg | Std. Error |
|---|---|---|---|
| Untreated | 0 | 16.3 | 0.7 |
| UF 80 | 1 | 23.1 | 1.0 |
| Polylactic acid | 1 | 22.4 | 0.6 |
| UF 80 | 0.75 | 21.3 | 1.7 |
| Polylactic acid | 0.75 | 22.3 | 1.2 |

TABLE 4-continued

| Additive | Dose, % | Average Crush Strength, Kg | Std. Error |
|---|---|---|---|
| UF 80 | 0.5 | 20.6 | 0.9 |
| Polylactic acid | 0.5 | 20.6 | 0.5 |

From the above data it is apparent that the polylactic acid yielded a crushing strength (hardness) that was much greater than untreated urea and with the standard deviation for UF-80 at treatment levels down to 0.5%.

EXAMPLE 4

Materials and methods were identical to Example 2. In addition, urea granules were tested for moisture absorption or hygroscopicity by storing duplicate granules for 48 hours at 22° C. and 95% relative humidity. The percent moisture absorption was determined by weighing and calculating the percent gain in weight. Initial granule weights were 2 grams, +/−0.1 grams. Crush strength and moisture uptake results are presented in Table 5.

TABLE 5

| Additive | Dose. % | | Std. Error |
|---|---|---|---|
| | | Average Crush Strength, Kg | |
| Untreated | 0 | 15.1 | 2.2 |
| UF 80 | 0.88 | 20.9 | 1.7 |
| Polylactic acid | 0.26 | 20.5 | 1.7 |
| Polylactic acid | 0.13 | 17.9 | 0.6 |
| Polylactic acid | 0.065 | 16.5 | 0.8 |
| | | Moisture uptake, % of initial weight | |
| Untreated | 0 | 119 | 0.0 |
| UF 80 | 0.88 | 116.9 | 0.05 |
| Polylactic acid | 0.26 | 116.3 | 0.25 |
| Polylactic acid | 0.13 | 116.7 | 0.35 |
| Polylactic acid | 0.065 | 117.7 | 0.75 |

From the above data it is apparent that the polylactic acid yielded a crushing strength (hardness) that was much greater than untreated urea and was equal to UF-80 at treatment levels down to 0.26%. Based on this data, both UF 80 and polylactic acid result in less hygroscopic urea granules. In addition, polylactic acid gave similar reduction in moisture uptake down to dose of 0.13%.

The above specification, examples, and data provide a complete description of the manufacture and use of the conditioned fertilizer product of the invention. Since many embodiments of the invention can be made without departing from the spirit and scope of the invention, the invention resides in the claims hereinafter appended.

We claim:

1. A conditioned fertilizer product comprising:
   urea containing fertilizer; and
   a conditioning amount of lactic acid derived conditioning agent, wherein the lactic acid derived conditioning agent comprises lactide.

2. A conditioned fertilizer product according to claim 1, wherein the lactic acid derived conditioning agent is provided at a concentration of between about 0.1% by wt. and about 5% by wt.

3. A conditioned fertilizer product according to claim 1, wherein the urea containing fertilizer comprises at least about 50% by wt. urea.

4. A conditioned fertilizer product according to claim 1, wherein the conditioned fertilizer product is provided in the form of granules having an average size of between about 0.7 mm and about 5 mm.

5. A conditioned fertilizer product comprising:
   a product of mixing, at a temperature of between about 135° C. and about 145° C., urea containing fertilizer and between about 0.1% by weight and about 5% by weight conditioning agent, wherein the conditioning agent comprises polylactide having a weight average molecular weight of less than about 25,000.

6. A conditioned fertilizer product according to claim 5, wherein the conditioning agent is provided in a concentration of between about 0.2% by weight and about 2% by weight.

7. A conditioned fertilizer product according to claim 5, wherein the conditioning agent is provided in a concentration of between about 0.2% by weight and about 0.4% by weight.

8. A conditioned fertilizer product according to claim 5, wherein the conditioned fertilizer product is provided in the form of granules having an average size between about 0.7 mm and about 5 mm.

9. A conditioned fertilizer product according to claim 5, wherein the conditioning agent has a melt flow index of greater than 500 grams according to ASTM D-1238 at 135° C.

10. A conditioned fertilizer product according to claim 5, wherein the conditioned fertilizer comprises granules exhibiting an average crush strength of greater than about 15 kg, and a moisture absorption of less than 121%.

11. A method for conditioning fertilizer, the method comprising steps of:
   (a) mixing urea containing fertilizer and conditioning agent at a temperature of between about 135° C. and about 145° C. to provide a molten mixture of urea containing fertilizer and conditioning agent, wherein the conditioning agent comprises polylactide having a number average molecular weight of less than about 25,000; and
   (b) cooling the mixture to provide granules.

12. A method according to claim 11, wherein the step of mixing comprises adding conditioning agent in an amount between about 0.2% by weight and about 2% by weight.

13. A method according to claim 11, wherein the step of mixing comprises adding conditioning agent in an amount of between about 0.2% by weight and 0.4% by weight.

14. A method according to claim 11, wherein said granules have an average particle size of between about 0.7 mm and about 5 mm.

15. A method according to claim 11, wherein the step of mixing comprises mixing for between about 5 seconds and about 120 seconds.

16. A method for using conditioned fertilizer product, the method comprising steps of:
   (a) applying fertilizer granules to soil using motor driven fertilizer spreading equipment, wherein the fertilizer granules comprise a product of mixing, at a temperature of between about 135° C. and about 145° C., urea containing fertilizer and between about 0.1% by weight and about 5% by weight conditioning agent, wherein the conditioning agent comprises lactide.

17. A method for using conditioned fertilizer product according to claim 16, wherein the motor driven fertilizer spreading equipment comprises a rotating turbine fan field distribution equipment.

18. A conditioned fertilizer product comprising:
   a product of mixing, at a temperature of between about 135° C. and about 145° C., urea containing fertilizer and between about 0.1% by weight and about 5% by weight conditioning agent, wherein the conditioning agent comprises lactide.

19. A conditioned fertilizer product according to claim 18, wherein the conditioning agent is provided in a concentration of between about 0.2% by weight and about 2% by weight.

20. A conditioned fertilizer product according to claim 18, wherein the conditioning agent is provided in a concentration of between about 0.2% by weight and about 0.4% by weight.

21. A conditioned fertilizer product according to claim 18, wherein the conditioned fertilizer product is provided in the form of granules having an average size between about 0.7 mm and about 5 mm.

22. A conditioned fertilizer product according to claim 18, wherein the conditioned fertilizer comprises granules exhibiting an average crush strength of greater than about 15 kg, and a moisture absorption of less than 121%.

23. A conditioned fertilizer product comprising:
   urea containing fertilizer; and
   a conditioning amount of a lactic acid derived conditioning agent, wherein the lactic acid derived conditioning agent comprises polylactide having a number average molecular weight of less than about 25,000.

24. A conditioned fertilizer product according to claim 23, wherein the lactic acid derived conditioning agent is provided at a concentration of between about 0.1% by wt. and about 5% by wt.

25. A conditioned fertilizer product according to claim 23, wherein the urea containing fertilizer comprises at least about 50% by wt. urea.

26. A conditioned fertilizer product according to claim 23, wherein the lactic acid derived conditioning agent has a melt flow index of greater than 500 grams according to ASTM D-1238 at 135° C.

27. A conditioned fertilizer product according to claim 23, wherein the conditioned fertilizer product is provided in the form of granules having an average size of between about 0.7 mm and about 5 mm.

28. A method for conditioning fertilizer, the method comprising steps of:
   (a) mixing urea containing fertilizer and conditioning agent at a temperature of between about 135° C. and about 145° C. to provide a molten mixture of urea containing fertilizer and conditioning agent, wherein the conditioning agent comprises lactide; and
   (b) cooling the mixture to provide granules.

29. A method according to claim 28, wherein the step of mixing comprises adding conditioning agent in an amount between about 0.2% by weight and about 2% by weight.

30. A method according to claim 28, wherein the step of mixing comprises adding conditioning agent in an amount of between about 0.2% by weight and 0.4% by weight.

31. A method according to claim 28, wherein said granules have an average particle size of between about 0.7 mm and about 5 mm.

32. A method according to claim 28, wherein the step of mixing comprises mixing for between about 5 seconds and about 120 seconds.

33. A method for using conditioned fertilizer product, the method comprising steps of:
   (a) applying fertilizer granules to soil using motor driven fertilizer spreading equipment, wherein the fertilizer granules comprise a product of mixing, at a temperature of between about 135° C. and about 145° C., urea containing fertilizer and between about 0.1% by weight and about 5% by weight conditioning agent, wherein the conditioning agent comprises polylactide having a number average molecular weight of less than about 25,000.

34. A method for using conditioned fertilizer product according to claim 33, wherein the motor driven fertilizer spreading equipment comprises a rotating turbine fan field distribution equipment.

* * * * *